United States Patent
Wei et al.

(10) Patent No.: US 7,502,238 B2
(45) Date of Patent: Mar. 10, 2009

(54) RECTIFIER FOR REDUCING CURRENT HARMONICS FROM UNBALANCED SOURCE

(75) Inventors: Lixiang Wei, Whitefish Bay, WI (US); Gary L. Skibinski, Milwaukee, WI (US); Richard A. Lukaszewski, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 448 days.

(21) Appl. No.: 11/095,015

(22) Filed: Mar. 31, 2005

(65) Prior Publication Data
US 2006/0227582 A1    Oct. 12, 2006

(51) Int. Cl.
  H02M 1/12    (2006.01)
  H02M 5/45    (2006.01)
  H02P 5/28    (2006.01)
(52) U.S. Cl. ............... 363/44; 363/37; 318/807
(58) Field of Classification Search ........... 363/34–37, 363/39, 40, 44–46; 318/800–804, 807
See application file for complete search history.

(56) References Cited

U.S. PATENT DOCUMENTS

| | | | | |
|---|---|---|---|---|
| 5,568,371 | A | * | 10/1996 | Pitel et al. ............... 363/39 |
| 5,790,356 | A | * | 8/1998 | Bottrell et al. ............ 361/35 |
| 6,031,738 | A | * | 2/2000 | Lipo et al. ................ 363/37 |
| 6,130,832 | A | * | 10/2000 | Julian ..................... 363/127 |
| 6,747,881 | B2 | * | 6/2004 | Schreiber ................. 363/37 |
| 6,791,848 | B2 | * | 9/2004 | Porter et al. ............. 363/21.01 |

OTHER PUBLICATIONS

M.T. Aydemir, et al., Utilization of a Series Resonant DC Link for a DC Motor Drive, IEEE Transactions on Industry Applications, vol. 29, No. 5, Sep./Oct. 1993, pp. 949-958.
Robert G. Ellis, Harmonic Analysis of Industrial Power Systems, IEEE Transactions on Industry Applications, vol. 32, No. 2, Mar./Apr. 1996, pp. 417-421.
Gary L. Skibinski, et al., Cost Effective Multi-Pulse Transformer Solutions for Harmonic Mitigation in AC Drives, IEEE 2003 Industry Application Society (IAS) Conference, pp. 1-10.
Sewan Choi, et al., Polyphase Transformer Arrangements with Reduced kVA Capacities for Harmonic Current Reduction in Rectifier-Type Utility Interface, IEEE Transactions on Power Electronics, vol. II, No. 5, Sep. 1996, pp. 680-690.
Fang Z. Peng, Harmonic Sources and Filtering Approaches, IEEE Industry Applications Magazine, Jul./Aug. 2001, pp. 18-25.

(Continued)

Primary Examiner—Matthew V Nguyen
(74) Attorney, Agent, or Firm—Quarles & Brady LLP; Alexander R. Kuszewski

(57) ABSTRACT

A rectifier includes a transformer, a rectifying bridge, a link capacitor, and at least a first resonance loop. The transformer is operable to receive three phase input signals having a source frequency and generate a plurality of transformer phase signals. The rectifying bridge has a number of stages corresponding to the number of transformer phase signals and is operable to generate a rectified output signal based on the transformer phase signals. The link capacitor is coupled across the rectifying bridge. The first resonance loop is coupled between the rectifying bridge and the link capacitor. The first resonance loop has a first resonance frequency corresponding to a harmonic frequency of the source frequency.

18 Claims, 8 Drawing Sheets

OTHER PUBLICATIONS

K. Oguchi, et al., Voltage-Phase Shifting Effect of Three-Phase Harmonic Canceling Reactors and Their Applications to Three-Level Diode Rectifiers, Faculty of Engineering, Ibaraki University, Hitachi, Japan, copyright 1999 IEEE.

Mark F. McGranaghan, et al., Designing Harmonic Filters for Adjustable-Speed Drives to Comply with IEEE-519 Harmonic Limits, IEEE Transactions on Industry Applications, vol. 35, No. 2, Mar./Apr. 1999, pp. 312-318.

* cited by examiner

RECTIFIER FOR REDUCING CURRENT HARMONICS FROM UNBALANCED SOURCE

CROSS-REFERENCE TO RELATED APPLICATIONS

Not applicable.

STATEMENT REGARDING FEDERALLY SPONSORED RESEARCH OR DEVELOPMENT

Not applicable

BACKGROUND OF THE INVENTION

The present invention relates generally to power conversion and conditioning and, more particularly, to a rectifier for reducing current harmonics from an unbalanced source.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art.

Power plants are linked to power consuming facilities (e.g., buildings, factories, etc.) via utility grids designed so as to be extremely efficient in delivering massive amounts of power. To facilitate efficient distribution, power is delivered over long distances as low frequency three-phase AC current.

Despite being distributable efficiently, low frequency AC current is sometimes not suitable for end use in consuming facilities. Thus, prior to end use power delivered by a utility has to be converted to a useable form. To this end a typical power "conditioning" configuration includes an AC-to-DC rectifier that converts the utility AC power to DC across positive and negative DC buses (i.e., across a DC link) and an inverter linked to the DC link that converts the DC power back to three phase AC power having an end-useable form (e.g., three phase relatively high frequency AC voltage). A controller controls the inverter in a manner calculated to provide voltage waveforms required by the consuming facility.

Motors and their associated loads are one type of common inductive load employed at many consuming facilities. While the present invention is applicable to different load types, to simplify this explanation, an exemplary motor with an associated load will be assumed. To drive a motor an inverter includes a plurality of switches that can be controlled to link and delink the positive and negative DC buses to motor supply lines. The linking-delinking sequence causes voltage pulses on the motor supply lines that together define alternating voltage waveforms. When controlled correctly, the waveforms cooperate to generate a rotating magnetic field inside a motor stator core. The magnetic field induces (hence the nomenclature "induction motor") a field in motor rotor windings. The rotor field is attracted to the rotating stator field and hence the rotor rotates within the stator core.

Standard AC drive topologies utilize AC-DC-AC power conversion with a three phase rectifying bridge for the AC-DC function. A three-phase diode bridge generates pulse type current that includes significant total harmonic current distortion. As AC drives proliferate, equipment system specifications limiting the amount of harmonic current injected into the utility grid are becoming more common and thus solicit cost effective harmonic mitigation solutions. System specifications are often written so measured total harmonic distortion at the Point of Common Coupling (PCC) complies with the maximum low voltage total harmonic distortion levels (THDV) and system classification of IEEE 519. The PCC is usually at the power metering point where other customers connect to the common line voltage but may also be within a plant where linear and non-linear loads are connected. One technique for reducing the harmonics content is to add filters on the AC side of the rectifier. However, the installation of filters can make the overall system bulky and expensive.

A multiple-pulse rectifier is an alternative way to address the distortion problem. Multiple-pulse rectifiers employ a transformer to convert the 3 phase input voltages to a higher number of phases and then use a larger bridge to rectify the waveforms. For example, an 18 pulse rectifier employs a 9-phase transformer to generate 9 voltage signals from a 3 phase source and an 18 diode rectifying bridge to generate the current pulses. Such a multiple-phase rectifier provides low input current THD, near unity power factor under all working conditions, no resonance, and cost effectiveness in higher power ratings. The 18-pulse rectifier is capable of meeting the IEEE-519 specification requirements under balanced source voltage.

However, the 18-pulse rectifier is susceptible to source distortions. Among them, phase unbalance is the most significant condition because the 18-pulse rectifier shows almost zero impedance to the negative sequences. Another significant distortion are the 5th order harmonics commonly seen in power systems using six diode/thyristor rectifiers located near the PCC. The effects of these factors, phase unbalance and harmonic content, increase to certain values, the current THD of an 18-pulse rectifier may increase significantly and exceed the IEEE-519 recommended current limit.

BRIEF SUMMARY OF THE INVENTION

The present inventors have recognized that a rectifier may be provided with one or more resonance loops tuned to harmonic frequencies of the AC input frequency to reduce total harmonic distortion caused by the rectifier.

One aspect of the present invention is seen in a rectifier including a transformer, a rectifying bridge, a link capacitor, and at least a first resonance loop. The transformer is operable to receive three phase input signals having a source frequency and generate a plurality of transformer phase signals. The rectifying bridge has a number of stages corresponding to the number of transformer phase signals and is operable to generate a rectified output signal based on the transformer phase signals. The link capacitor is coupled across the rectifying bridge. The first resonance loop is coupled between the rectifying bridge and the link capacitor. The first resonance loop has a first resonance frequency corresponding to a harmonic frequency of the source frequency.

Another aspect of the present invention is seen in a motor control system including a power supply, a rectifier, an inverter, and a motor. The power supply is operable to provide three phase input signals having a source frequency. The rectifier is operable to receive the three phase input signals and generate a direct current output signal over positive and negative buses. The rectifier comprises at least a first direct current resonance loop having a first resonance frequency corresponding to a harmonic frequency of the source frequency. The inverter is operable to switch between the positive and negative buses to generate a plurality of motor drive signals. The motor is operable to rotate responsive to the plurality of motor drive signals.

These and other objects, advantages and aspects of the invention will become apparent from the following description. The particular objects and advantages described herein may apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE SEVERAL VIEWS OF THE DRAWINGS

The invention will hereafter be described with reference to the accompanying drawings, wherein like reference numerals denote like elements, and.

Figure 1:
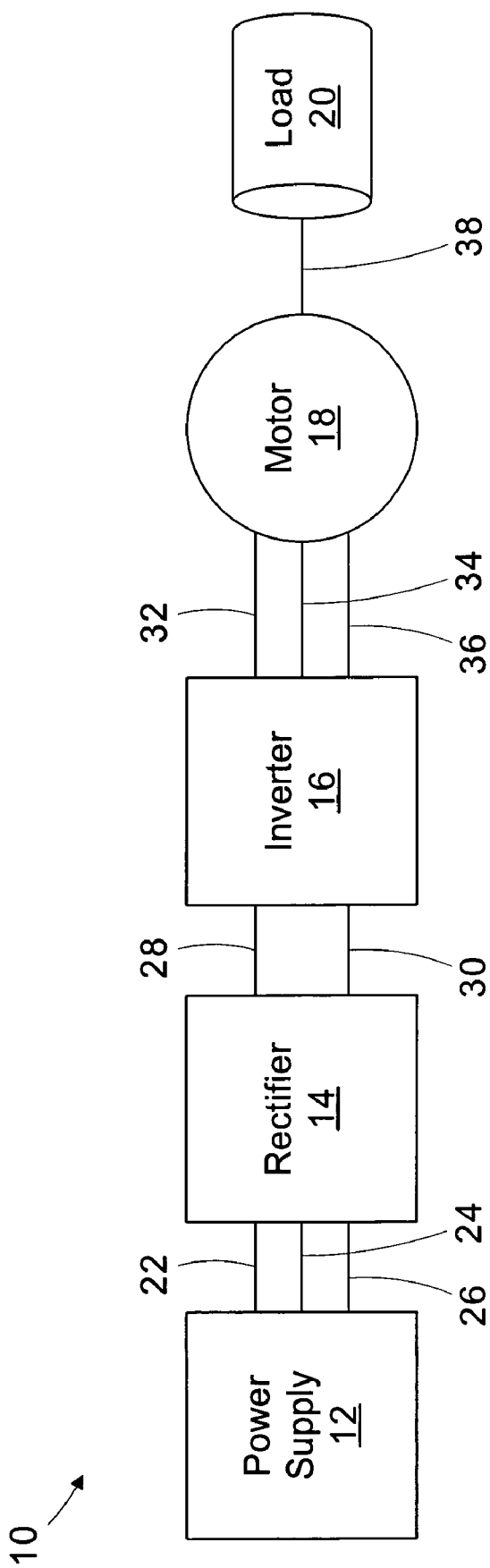
FIG. 1 is a simplified diagram of a motor control system in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Figure 2:
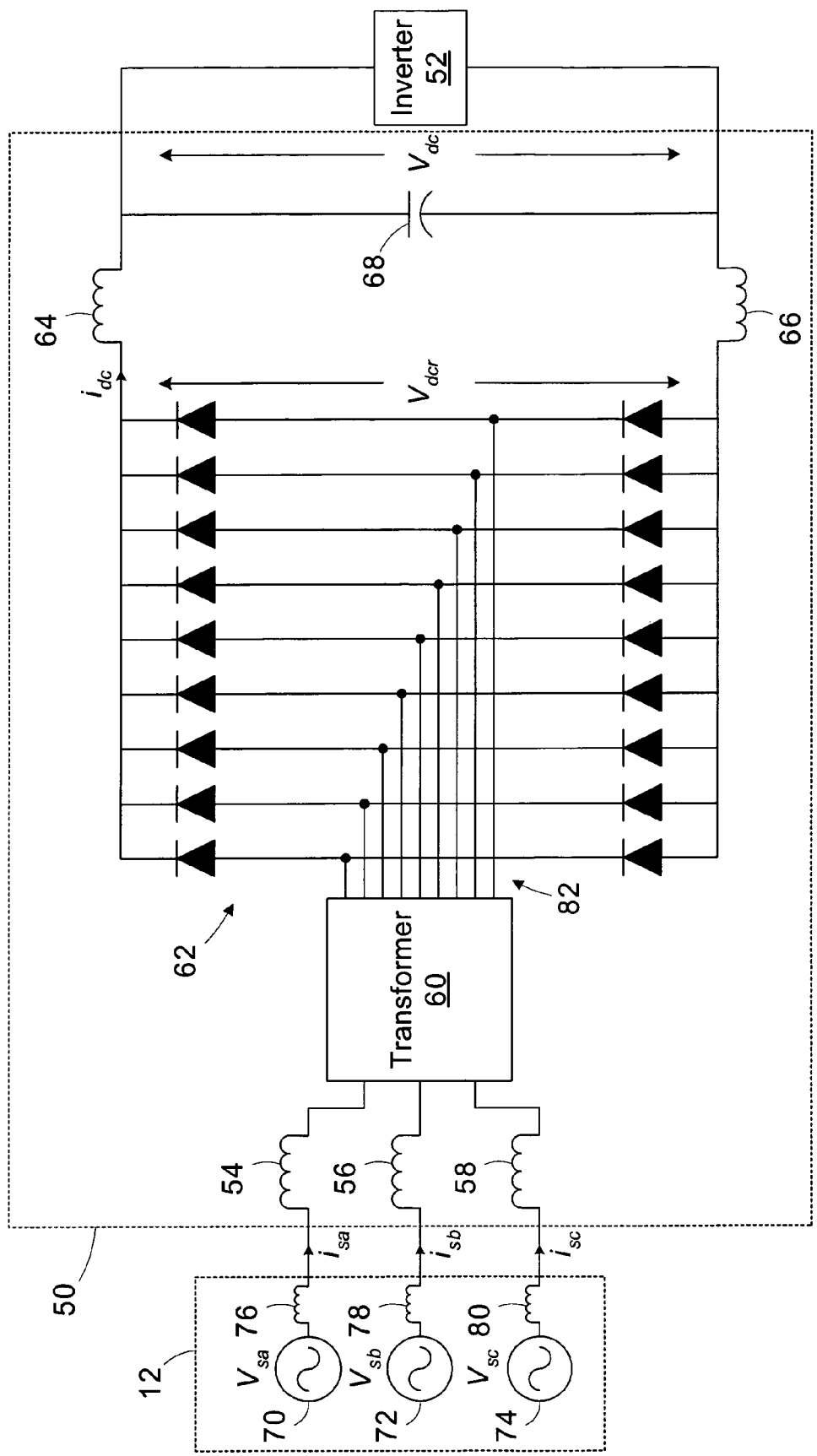
FIG. 2 is a diagram of a prior art rectifier.

Referring now to the drawings wherein like reference numbers correspond to similar components throughout the several views and, specifically, referring to FIG. 2, the present invention shall be described in the context of Referring now to the drawings wherein like reference numbers correspond to similar components throughout the several views and, specifically, referring to FIG. 1, the present invention shall be described in the context of an exemplary motor control system 10. The motor control system 10 includes a power supply 12, a rectifier 14, an inverter 16, a three-phase motor 18, a load 20, and a plurality of lines and buses that link the aforementioned components together in the manner described hereinafter. The power supply 12 typically provides a three phase AC voltage received from a utility grid over lines 22, 24, 26. The nominal line voltage of the power supply 12 may vary depending on the particular implementation. The rectifier 14 receives 3-phase power from the power supply 12 and converts the AC power to DC. The inverter 16 is positioned between positive and negative DC buses 28, 30 of the rectifier 14. Although not illustrated, as is well known in the motor controls industry, the inverter 16 includes a plurality of switching devices (e.g., BJT's, etc.) that are positioned between the positive and negative DC buses 28, 30 and supply lines 32, 34, and 36 such that by opening and closing specific combinations of the inverter switches, positive and negative DC voltage pulses are generated on each of lines 32, 34, and 36. By opening and closing the inverter switches in specific sequences, AC voltages having controllable amplitudes and frequencies can be generated on each of supply lines 32, 34, and 36.

Each of lines 32, 34, and 36 is linked to a separate one of three-phase windings (not separately numbered or illustrated) of the motor 18. By providing known sequences of AC voltages across the motor windings, varying currents are caused therein which induce a rotating magnetic field within a motor stator core. A motor rotor (not illustrated) which is linked to a motor shaft 38 resides within the motor core. The rotor includes either bars or windings or both and, when the changing and rotating magnetic field within the stator core intersects the rotor, currents are induced within the rotor and the rotor currents in turn cause a rotor magnetic field within the stator core. The rotor field is attracted by the rotating stator field and hence the rotor rotates within the stator core. The load 20 is attached via shaft 38 to the rotor and therefore, when the rotor rotates, load 20 also tends to rotate in the same direction.

Although the rectifier 14 of the present invention is described as it may be used to provide DC power for the inverter 16 for controlling the motor 18, the application of the present invention is not limited to a motor application. For example, the rectifier 14 may be connected to some other load, such as a common DC bus load, which in turn is connected to a group of inverters.

Prior to examining the rectifier 14 in accordance with the present invention, it is first useful to discuss the theory of an 18 pulse rectifier circuit to illustrate the source of the harmonics. FIG. 2 illustrates an exemplary prior art rectifier circuit 50 connected to an inverter load 52. The rectifier circuit 50 includes AC inductors 54, 56, 58, a transformer 60, an 18 diode rectifying bridge 62, DC choke inductors 64, 66, and a DC link capacitor 68. The power supply 12 includes voltage sources 70, 72, 74, representing the three phase AC power supplied by the power supply 12. Inductors 76, 78, 80 represent the source inductance of the power supply 12.

Still referring to FIG. 2, the transformer 60 is a conventional 18 pulse auto-transformer that generates a 9-phase output signal over lines 82 based on the three phase input signal provided by the voltage sources 70, 72, 74. The application of the present application is not limited to any particular transformer topology. The Other transformer types may be used, and the number of phases generated by the transformer 60 may vary (e.g., 6-phase, 9-phase, 12-phase, etc.) The nine phase diode rectifying bridge 62 is connected between the transformer 60 and the DC link capacitor 68. The AC inductors 54, 56, 58 and the DC choke inductors 64, 66 smooth both the source current, $i_{sa}$, $i_{sb}$, and $i_{sc}$, and the DC link current, $i_{dc}$.

The definition of converter voltage/current space vectors for the rectifier 50 is given by the equation:

$$\vec{x} = \sqrt{\frac{2}{3}}(x_a + \alpha x_b + \alpha^2 x_c); \quad \alpha = \left(-\frac{1}{2} + j\frac{\sqrt{3}}{2}\right) \quad (1)$$

where x is a variable that can represent three phase source voltage, source current, or the switching function.

To simplify the system analysis, it is assumed that the transformer 60 is an ideal transformer and the leakage inductance in each phase can be ignored. When the source voltages are balanced, the rectifier 50 can eliminate harmonics up to 16th order. As a result, the switching function vector of the diode bridge 62 plus the transformer 60 can be represented as:

$$\vec{S} = \left(S_1 + \sum_{k>2} S_{6k} e^{j(6k\omega t + \varphi_{6k})}\right) \cdot e^{j\omega t} \quad (2)$$

where $\vec{S}$ is the switching function vector of the 18-pulse rectifier, $S_1$ is the amplitude of the fundamental component, $S_{6k} \ll S_1$ is the amplitude of the 6k order of the harmonics components, $\omega$ is the fundamental electrical angle frequency of the source voltage, and $\phi_{6k}$ is the angle of 6kth order harmonics at time t=0.

By neglecting the forward voltage drop of the diodes in the rectifying bridge 62, the DC line voltage, $V_{dcr}$, across the of the rectifying bridge 62 can be calculated as:

$$V_{dcr} = \vec{V}_s \cdot \vec{S} \quad (3)$$

$$= V_m S_1 \cos(\varphi) + \sum_{k>2} V_m S_{6k} \cos(6k\omega t + \varphi_{6k}))$$

$$= V_{dc} + \sum_{k>2} V_{dc,6k} \frac{e^{j(6k\omega t + \varphi_{6k})} - e^{-j(6k\omega t + \varphi_{6k})}}{2}$$

Where, $V_{dcr}$ is the rectifier side voltage, $\vec{V}_s$ is the input voltage vector, $V_{dc}$ is the DC voltage across the DC link capacitor 68, $V_{dc,6k}$ is the amplitude of the 6kth order voltage harmonics in $V_{dcr}$, and $\Phi$ is the angle difference between the fundamental source voltage and the fundamental switching function.

Equation (3) shows that the DC link voltage has multiple 6kth (k>2) orders of voltage harmonics when the source voltage is balanced. These 6kth order of voltage harmonics create a corresponding order of current harmonics for the DC link current, $i_{dc}$. Assuming sufficient size of the DC link capacitor 68, the DC link current can be approximated as:

$$i_{dc}(t) \approx I_0 + \sum_{k>2} \frac{V_m S_{6k}}{6k\omega L} \sin(6k\omega t + \varphi_{6k}) \quad (4)$$

-continued $$= I_0 + \sum_{k>2} I_{dc,6k} \frac{e^{j(6k\omega t + \varphi_{6k} - \frac{\pi}{2})} - e^{-j(6k\omega t + \varphi_{6k} - \frac{\pi}{2})}}{2}$$

$$= I_0 + \sum_{k>2} (\vec{i}_{dc,6k} + \vec{i}_{dc,-6k})$$

where, $I_0$ is the DC component of the DC link current, $\vec{i}_{dc,6k}$ and $\vec{i}_{dc,6k}$ are the 6kth and -6kth order of harmonics respectively, and $I_{dc,6k}$ is the amplitude of the 6kth order current harmonics.

Generally, since the harmonics voltages have much smaller amplitudes than that of the fundamental component and the inductance has much larger impedance at the higher harmonics orders, the harmonic components of the DC link current are much smaller than the DC link current at the rated load condition and can be neglected.

$$|I_{6k}| \ll I_0 \quad (5)$$

Finally, the current harmonics at the source side for the rectifier 50 can be calculated as.

$$\vec{i}_s i_{dc}(t) \vec{S} \quad (6)$$

where, $\vec{i}_s$ is the input current vector.

Combining equations (2), (4), and (5), the source current can be calculated as:

$$\vec{i}_s \approx \left(\vec{i}_1 + \sum_{k>2}(\vec{i}_{1-6k} + \vec{i}_{6k+1})\right)e^{j\omega t} \quad (7)$$

where, $\vec{i}_1$, $\vec{i}_{1-6k}$, $\vec{i}_{6k+1}$ are the fundamental, 1-6kth and 6k+1th order of current vectors of the source current.

By neglecting the second order component in equation (7), the line side harmonics under balanced conditions becomes:

$$\vec{i}_s \approx \vec{i}_1 + \sum_{k>2}(\vec{i}_{1-6k} + \vec{i}_{6k+1}) \quad (8)$$

$$\vec{i}_1 \approx S_1 I_0 e^{j\omega t}; \vec{i}_{1-6k} \approx S_1 \vec{i}_{-6k} e^{j\omega t}; \vec{i}_{6k+1} \approx S_1 \vec{i}_{6k} e^{j\omega t}$$

From equation (8), it shows that the input current of the rectifier 50 under balanced conditions contains $-17^{th}$, $19^{th}$, $-23^{rd}$, $25^{th}$ and higher orders of harmonic components.

Now, the theory of the rectifier 50 is examined under unbalanced conditions (e.g., phase unbalance). Generally, the most widely seen voltage harmonics in the sources voltage are negative sequence (i.e., caused by phase unbalance), $-5^{th}$ and $7^{th}$ order, $-11^{th}$ and $13^{th}$ order harmonics. The input voltage source vector under unbalanced conditions can be simplified as:

$$\vec{V}_s = V_1 e^{j\alpha x + \phi} + V_{-1} e^{-j\alpha x + \phi_{-1}} + V_{-5} e^{-j5\alpha x + \phi_{-5}} + V_7 e^{j7\alpha x + \phi_7} + V_{-11} e^{-j11\alpha x + \phi_{-5}} + V_{13} e^{j13\alpha x + \phi_7} \quad (9)$$

where, $V_1/\phi_1$, $V_{-1}/\phi_{-1}$, $V_{-5}/\phi_{-5}$, $V_7/\phi_7$, $V_{-11}/\phi_{-11}$, $V_{13}/\phi_{13}$ are the amplitude/angle of the fundamental, negative sequence, $-5^{th}$ order, $7^{th}$ order, $-11^{th}$ order and $13^{th}$ order harmonics of the source voltage. Generally, the amplitudes of the harmonics are all very small compare to the fundamental components.

If the unbalance ratio of the source voltage is not severe, the switching function shown in equation (2) can still be effective. Thus, the harmonics voltage vectors in the source can cause low order of voltage harmonic components in the DC link voltage, which becomes:

$$\vec{V}_{dcr} = \vec{V}_s \cdot \vec{S} \quad (10)$$
$$= V_0 + V_{dc,2}\cos(2\omega t + \varphi_{dc,2}) +$$
$$\sum_{k>0} V_m S_{6k} \cos(6k\omega t + \varphi_{dc,6k}))$$

Similarly, the DC link current can be calculated as:

$$i_{dc}(t) \approx I_0 + \frac{V_{dc,2}\sin(2\omega t + \varphi_{dc,2})}{2\omega L} + \quad (11)$$
$$\sum_{k>0} \frac{V_m S_{6k}}{6k\omega L}\sin(6k\omega t + \varphi_{dc,6k})$$
$$= I_0 + \vec{i}_{dc,2} + \vec{i}_{dc,-2} + \sum_{k>0}\left(\vec{i}_{dc,6k} + \vec{i}_{dc,-6k}\right)$$

Comparing to equation (4), the 18 pulse rectifier operating under unbalanced condition has added $\pm 2^{nd}$, $\pm 6^{th}$, and $\pm 12^{th}$ order of harmonics in its DC link current.

The DC choke inductors 64, 66 and the and leakage inductance of the transformer 50 are relatively small under low order of harmonics. These additional low order of harmonics voltage components generate large amounts of low order harmonics in equation (11), which in turn adds large amounts of low order harmonics to the source current.

Combining equations (2) and (11), the input current vector can be approximated as $$\vec{i}_s \approx \vec{i}_1 + \vec{i}_{-1} + \vec{i}_3 + \sum_{k>0}\left(\vec{i}_{1-6k} + \vec{i}_{6k+1}\right) \quad (12)$$
$$\vec{i}_1 \approx S_1 I_0 e^{j\omega t}; \vec{i}_{-1} \approx S_1 \vec{i}_{-2} e^{j\omega t + \varphi_{-1}}; \vec{i}_3 \approx S_1 \vec{i}_2 e^{j\omega t + \varphi_3}$$

From equation (12), it is evident that the rectifier 50 under unbalanced conditions creates negative, $3^{rd}$, $5^{th}$, $7^{th}$, $11^{th}$, and $13^{th}$ order of current harmonics components into the source. Since the DC choke and leakage inductance are very small, the low order current harmonics can be substantial, even if the unbalance ratio of the input source voltage is not large.

Figure 3:
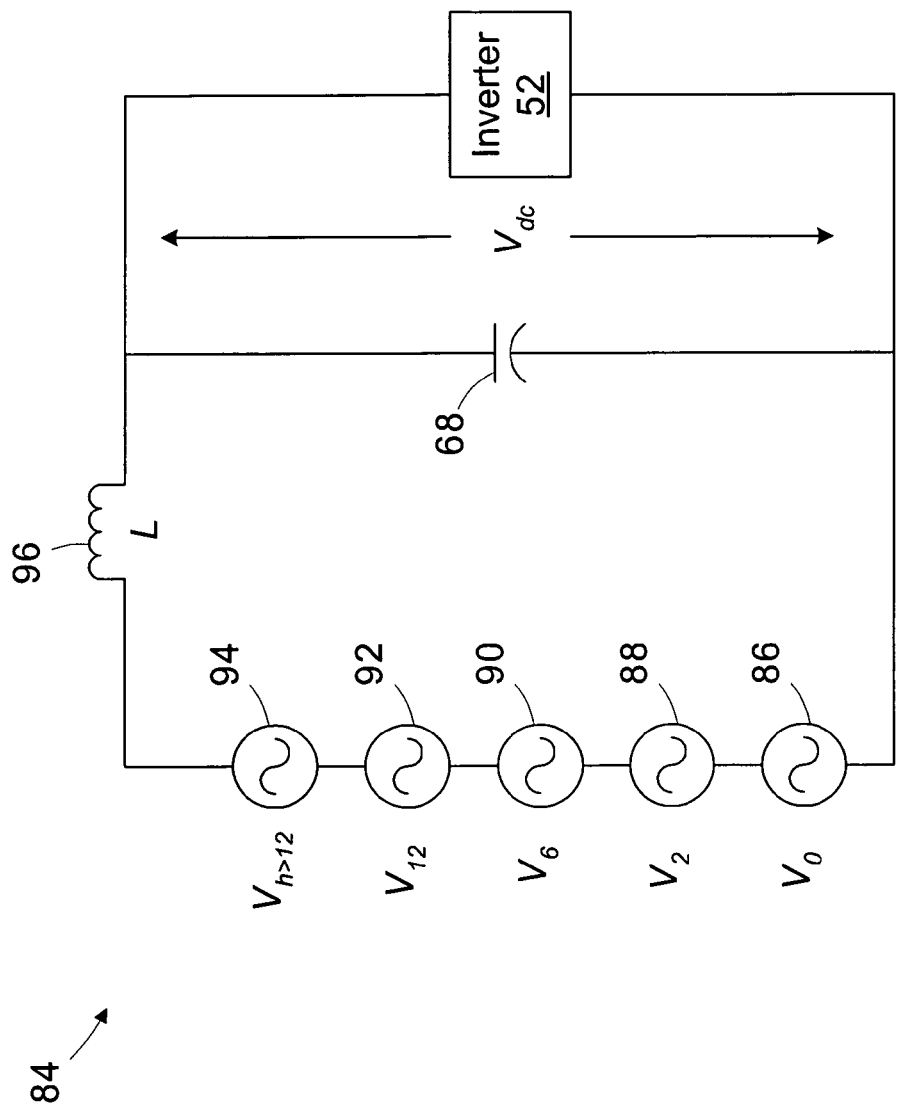
FIG. 3 is an equivalent DC circuit representation of the rectifier of FIG. 2.

FIG. 3 shows an equivalent DC link circuit 84 for the rectifier 50 of FIG. 2. The voltage sources 86, 88, 90, 92, and 94 represent the components of the DC link voltage, $V_{dcr}$, defined in equation (10). The inductor 96 represents the inductance of the DC choke inductors 64, 66 and the AC inductors 54, 56, 58, in accordance with the following relationship:

$$L \approx 2L_{dc} + 2L_{ac} + L_{leak} \quad (13)$$

where, $L_{dc}$ is the inductance of the DC choke inductors 64, 66, $L_{ac}$ is the inductance of the AC inductors 54, 56, 58, and $L_{leak}$ is the per phase leakage inductance of the transformer 60.

FIG. 3 illustrates that nearly all of the AC component of the DC link voltage is added to the DC choke "L". Reducing the current THD of the rectifier 50 requires the increasing of the inductance of either the DC choke $L_{dc}$ or the AC inductor $L_{ac}$ to increase the effective inductance, L. However, increasing these two values eventually reaches a point of diminishing returns as to the improvement in the current THD.

Figure 4:
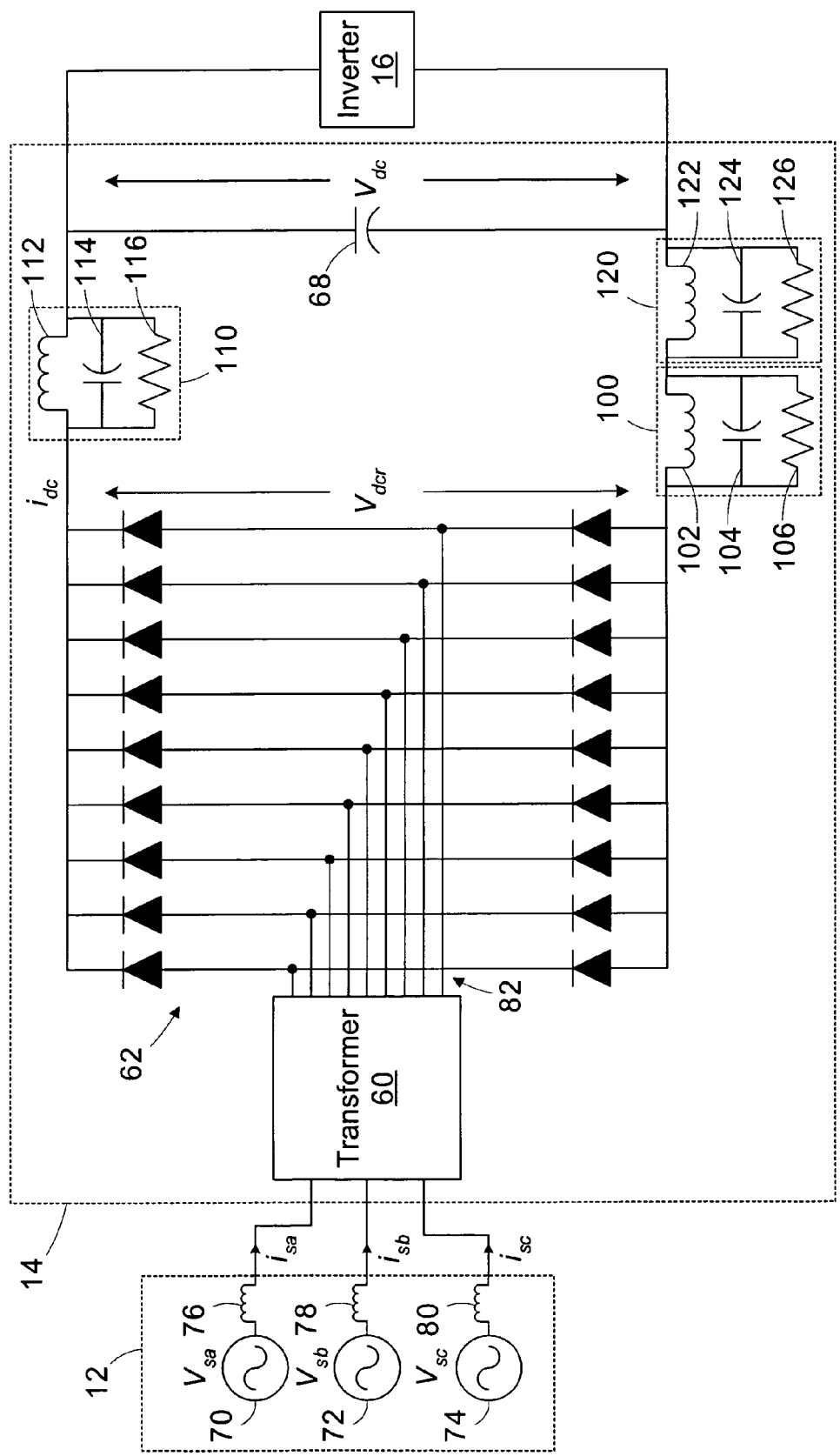
FIG. 4 is a diagram of a rectifier in the motor control system of FIG. 1.

Turning now to FIG. 4, a circuit diagram of the rectifier 14 of FIG. 1 including harmonic compensation in accordance with the present invention is provided. The rectifier 14 includes the transformer 60, rectifying bridge 62, and DC link capacitor 68 described above. The rectifier 14 also includes one or more resonance loops 100, 110, 120, each including an inductor 102, 112, 122, a capacitor 104, 114, 124, and a resistor 106, 116, 126, respectively. Note that the rectifier 14 does not employ the AC inductors 54, 56, 58 or the DC choke inductors 64, 66 seen in the rectifier 50 of FIG. 2. In some embodiments, not all of the resonance loops 100, 110, 120 may include a resistor 54, 56, 58. Generally, the resistor serves a damping purpose. A resistor may be used with one of the resonance loops 100, 110, 120, and the other loops may not have a resistive component.

The resonance loops 100, 110, 120 remove the harmonic components from the DC link current, $i_{dc}$. In the illustrated embodiment, the resonance loops 100, 110, 120 are tuned to remove the $2^{nd}$ order, $6^{th}$ order, and $12^{th}$ order harmonics, respectively. The values for the inductors 102, 112, 122, capacitors 104, 114, 124, and resistors 106, 116, 126 are selected using the following equation to tune the resonance loops 100, 110, 120 to the appropriate harmonic:

$$k\omega \cdot L_k = \frac{1}{k\omega \cdot C_k} \quad (14)$$

where, $L_k$ and $C_k$ are the inductance and capacitance of the kth order RC resonant loop, $k \in \{2,6,12\}$.

It should be noted that not all these three resonance loops 100, 110, 120 need be provided for every implementation. For example, simulation has demonstrated that the rectifier 14 is capable of achieving IEEE 519 specifications without the $12^{th}$ order resonant loop 120. The particular number of resonant loops 100, 110, 120 used may vary depending on the particular implementation.

Moreover, the particular design of the rectifier 12 may vary, resulting in different characteristics for the resonant loops 100, 110, 120. For example, the transformer 60 may generate a different number of phases (e.g., 6 phase –12 pulses or 12 phase –24 pulses) and the rectifying bridge 62 may vary in size accordingly. Generally, the rectifying bridge 62 has the same number of stages (i.e., each diode pair represents a stage) as the number of output phases of the transformer 60. Hence, the particular harmonics contributing significantly to the current THD may also vary, and the resonant loops 100, 110, 120 may vary in number and/or harmonic tuning.

Figure 5:
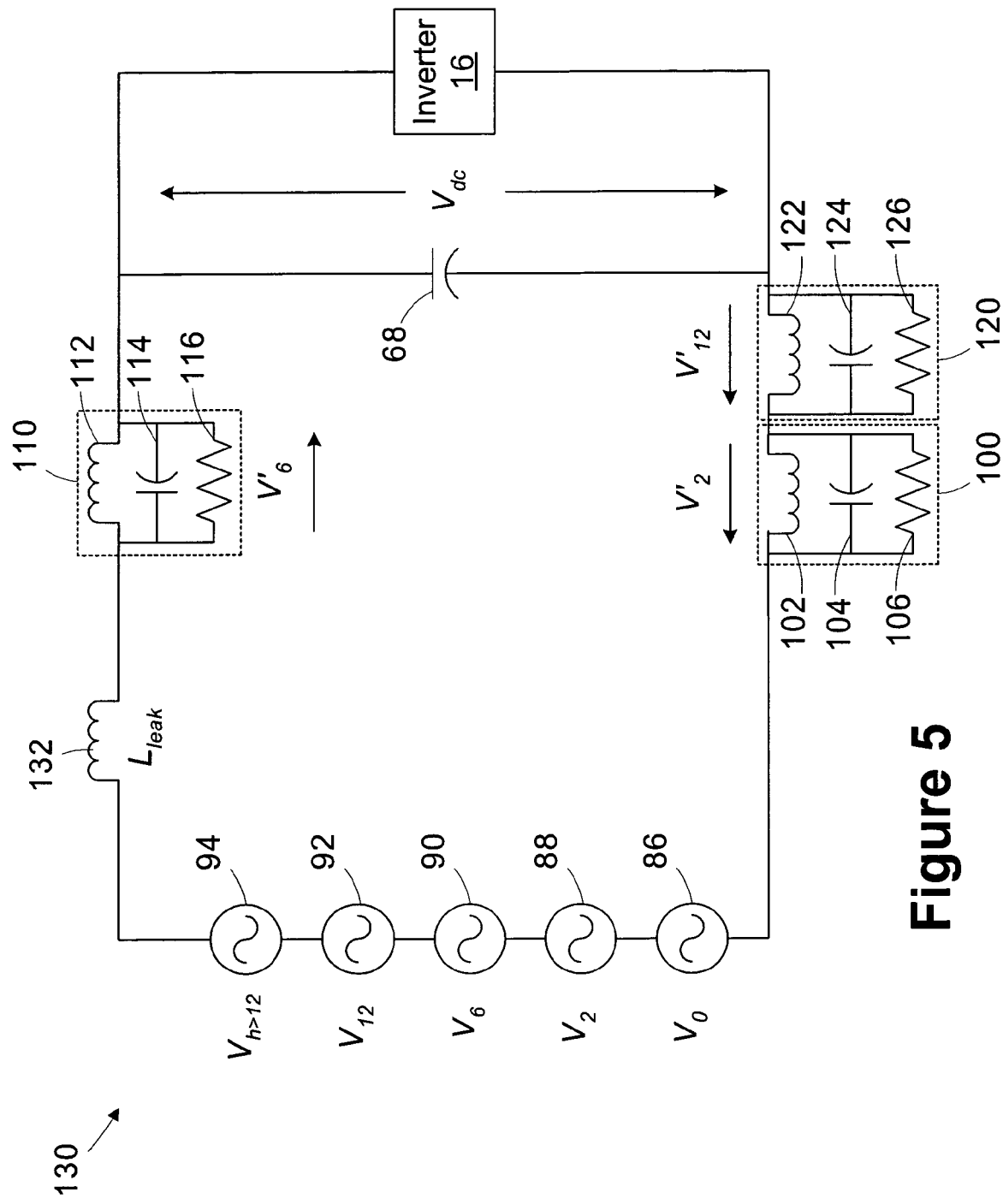
FIG. 5 is an equivalent DC circuit representation of the rectifier of FIG. 4.

Turning now to FIG. 5, an equivalent DC link circuit 130 of the rectifier 14 under unbalanced conditions is shown. The inductor 132 represents the per phase leakage inductance of the transformer 60. Since the resonance loops 100, 110, 120 have infinite impedances under their respective resonant frequencies, the generated harmonics voltages are compensated for by the resonance loops 100, 110, 120. The voltage drops of the three resonant loops 100, 110, 120 are defined by the following equations, respectively.

$$V'_k \approx V_{dc,k} + \sum_{h \neq k} k_h V_{dc,h} \approx V_{dc,k} \quad k_h \approx 0 \quad (15)$$

where $k \in \{2,6,12\}$ is the cancelled harmonics number.

The DC capacitor voltage now can be represented as $$V_{dc} \approx V_0 \quad (16)$$

Since most of the harmonic voltages are dropped by the resonant loops 100, 110, 120, the DC link current consists of only very small amount of AC components and can be shown as:

$$i_{dc}(t) \approx I_0 + \sum_{k>2}(\vec{i}_{6k} + \vec{i}_{-6k}) \approx I_0 \quad (17)$$

Employing the resonance loops 100, 110, 120 reduces the low order harmonics generated in the source current to a level much smaller than that calculated in equation (12) above for the uncompensated rectifier 50.

Figure 6:
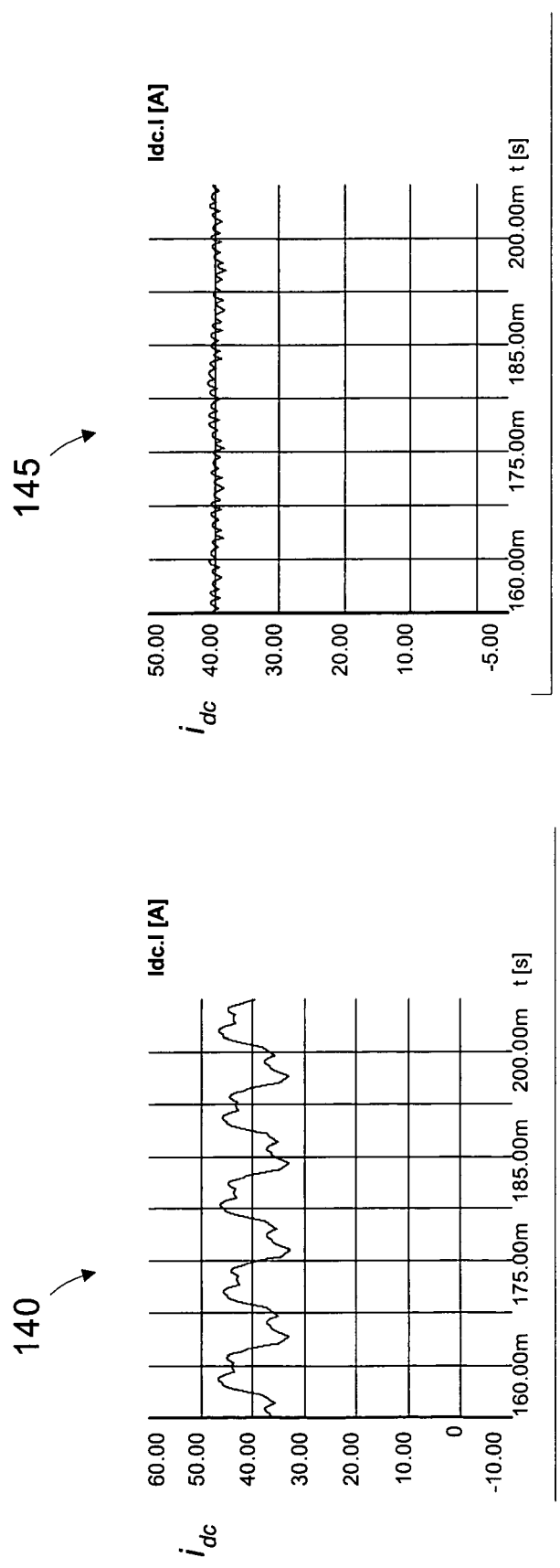
FIG. 6 illustrates curves comparing the DC link currents of the rectifiers of FIGS. 2 and 4.
Figure 7:
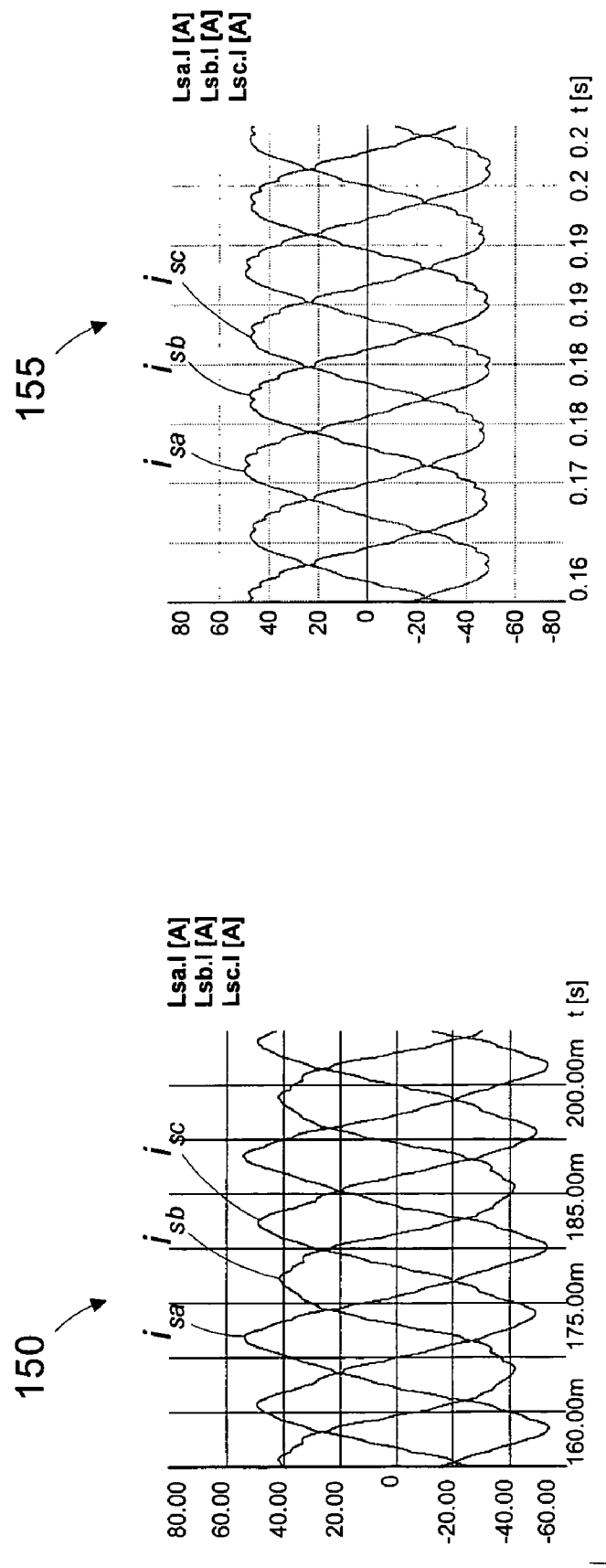
FIG. 7 illustrates curves comparing the source currents of the rectifiers of FIGS. 2 and 4.
Figure 8:
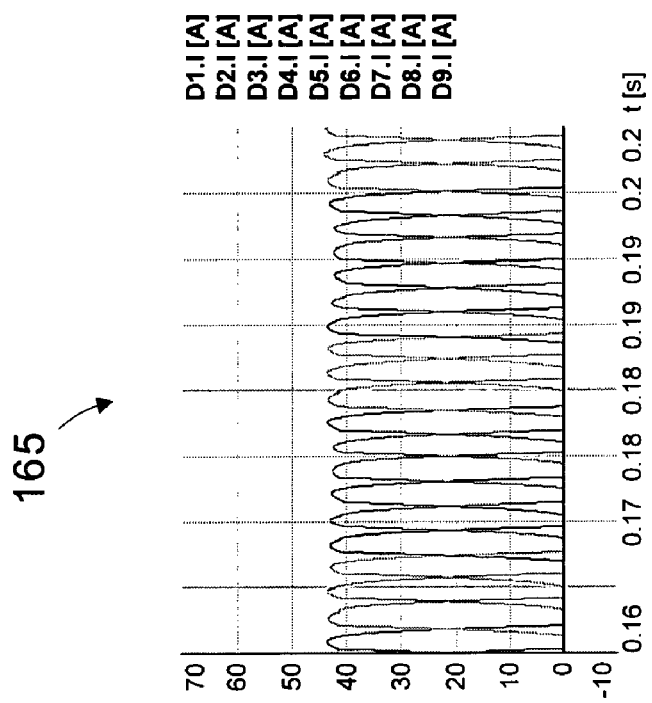
FIG. 8 illustrates curves comparing the diode currents of the rectifiers of FIGS. 2 and 4.
Figure 8:
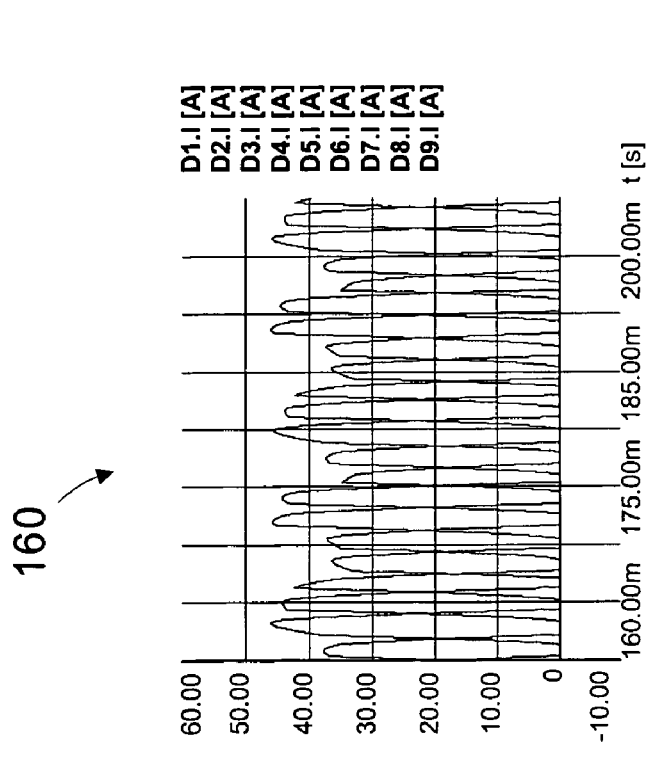

Turning now to FIGS. 6, 7, and 8, curves comparing the simulated performance of the uncompensated rectifier 50 of FIG. 2 and the compensated rectifier 14 of FIG. 4 are provided. The source voltage conditions for the simulation were defined to include the top limit for the voltage harmonics under IEEE 519 (i.e., 5th order: 3.5%). In addition a 3.5% negative sequence was included in the source voltage. These simulated conditions are significantly worse than seen in a typical source voltage scenario. Curves 140 and 145 in FIG. 6 show the DC link current, $i_{dc}$ of the uncompensated rectifier 50 and the compensated rectifier 14, respectively. The DC link current of the uncompensated rectifier 50 shown by curve 140 exhibits significant ripples, while the compensated rectifier 14 generates a DC link current shown by curve 145 that is nearly DC. Since any current ripple is mostly fed into the DC link capacitor 68, the RMS current of the DC link capacitor 68 for the uncompensated rectifier 50 is significantly higher than that of the compensated rectifier 14.

Referring to FIG. 7, curves 150 and 155 illustrate the three phase source currents, $i_{sa}$, $i_{sb}$, and $i_{sc}$ of the uncompensated rectifier 50 and the compensated rectifier 14, respectively. Under the conditions illustrated, the compensated rectifier 14 exhibits significantly more balanced source currents, and it performance meets IEEE 519 THD requirements (THD<4%). The uncompensated rectifier 50 fails to meet IEEE 519 requirements (THD>11%).

FIG. 8 illustrates the diode current waveforms for the rectifying bridge 62 in the uncompensated rectifier 50 (curve 160) and the compensated rectifier 14 (curve 165). Curve 165 demonstrates that the compensated rectifier 14 exhibits better current sharing of the input diode current, in that all diode currents have almost the same peak current value. However, in curve 160, the diode currents for the uncompensated rectifier 50 are notably unbalanced.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A rectifier, comprising:
   a transformer operable to receive three phase input signals having a source frequency and generate a plurality of transformer phase signals;
   a rectifying bridge having a number of stages corresponding to the number of transformer phase signals and operable to generate a rectified output signal based on the transformer phase signals;
   a link capacitor coupled across the rectifying bridge; and
   at least a first resonance loop coupled between the rectifying bridge and the link capacitor, the first resonance loop having a first resonance frequency corresponding to a harmonic frequency of the source frequency, wherein the first resonant loop includes at least an inductor and a capacitor coupled in parallel.

2. The rectifier of claim 1, wherein the first resonant loop is operable to block signals having frequencies corresponding to the first resonance frequency.

3. The rectifier of claim 1, further comprising a second resonance loop coupled between the rectifying bridge and the link capacitor, the second resonance loop having a second resonance frequency corresponding to a harmonic frequency of the source frequency.

4. The rectifier of claim 3, wherein the first resonance frequency corresponds to a second harmonic frequency of the source frequency, and the second resonance frequency corresponds to a sixth harmonic frequency of the source frequency.

5. The rectifier of claim 3, further comprising a third resonance loop coupled between the rectifying bridge and the link capacitor, the third resonance loop having a third resonance frequency corresponding to a harmonic frequency of the source frequency.

6. The rectifier of claim 5, wherein the first resonance frequency corresponds to a second harmonic frequency of the source frequency, the second resonance frequency corresponds to a sixth harmonic frequency of the source frequency, and the third resonance frequency corresponds to a twelfth harmonic frequency of the source frequency.

7. A rectifier, comprising:
   a transformer operable to receive three phase input signals having a source frequency and generate a plurality of transformer phase signals;
   a rectifying bridge having a number of stages corresponding to the number of transformer phase signals and operable to generate a rectified output signal based on the transformer phase signals;
   a link capacitor coupled across the rectifying bridge;
   at least a first resonance loop coupled between the rectifying bridge and the link capacitor, the first resonance loop having a first resonance frequency corresponding to a harmonic frequency of the source frequency; and
   wherein the first resonance loop comprises an inductor, a capacitor, and a resistor coupled in parallel.

8. The rectifier of claim 7, wherein $\omega$ represents the source frequency, k represents an integer corresponding to the order of the harmonic, $L_k$ represents an inductance of the inductor, $C_k$ represents a capacitance of the capacitor, and the first resonance loop is tuned in accordance with the equation:

$$k\omega \cdot L_k = \frac{1}{k\omega \cdot C_k}.$$

9. The rectifier of claim 1, wherein the transformer comprises at least one of a 6 phase transformer, a 9 phase transformer, and a 12 phase transformer.

10. A method of creating a rectifier, comprising:
providing a transformer operable to receive three phase input signals having a source frequency and generate a plurality of transformer phase signals;
providing a rectifying bridge having a number of stages corresponding to the number of transformer phase signals and operable to generate a rectified output signal based on the transformer phase signals;
providing a link capacitor coupled across the rectifying bridge; and
wherein at least a first resonance loop is coupled between the rectifying bridge and the link capacitor, the first resonance loop having a first resonance frequency corresponding to a harmonic frequency of the source frequency, wherein the first resonance loon comprises an inductor and a capacitor in parallel.

11. The method of claim 10, wherein the first resonant loop is operable to block signals having frequencies corresponding to the first resonance frequency.

12. The method of claim 10, further comprising a second resonance loop coupled between the rectifying bridge and the link capacitor, the second resonance loop having a second resonance frequency corresponding to a harmonic frequency of the source frequency.

13. The method of claim 12, wherein the first resonance frequency corresponds to a second harmonic frequency of the source frequency, and the second resonance frequency corresponds to a sixth harmonic frequency of the source frequency.

14. The method of claim 12, further comprising a third resonance loop coupled between the rectifying bridge and the link capacitor, the third resonance loop having a third resonance frequency corresponding to a harmonic frequency of the source frequency.

15. The method of claim 14, wherein the first resonance frequency corresponds to a second harmonic frequency of the source frequency, the second resonance frequency corresponds to a sixth harmonic frequency of the source frequency, and the third resonance frequency corresponds to a twelfth harmonic frequency of the source frequency.

16. The method of claim 10, wherein the first resonance loop further comprises a resistor in parallel with each of the inductor and the capacitor.

17. The method of claim 16, wherein $\omega$ represents the source frequency, k represents an integer corresponding to the order of the harmonic, $L_k$ represents an inductance of the inductor, $C_k$ represents a capacitance of the capacitor, and the first resonance loop is tuned in accordance with the equation:

$$k\omega \cdot L_k = \frac{1}{k\omega \cdot C_k}.$$

18. The method of claim 10, wherein the transformer comprises at least one of a 6 phase transformer, a 9 phase transformer, and a 12 phase transformer.

* * * * *